United States Patent
Senior et al.

(10) Patent No.: US 10,198,362 B2
(45) Date of Patent: Feb. 5, 2019

(54) REDUCING BANDWIDTH CONSUMPTION WHEN PERFORMING FREE MEMORY LIST CACHE MAINTENANCE IN COMPRESSED MEMORY SCHEMES OF PROCESSOR-BASED SYSTEMS

(71) Applicant: QUALCOMM Incorporated, San Diego, CA (US)

(72) Inventors: Richard Senior, San Diego, CA (US); Christopher Edward Koob, Round Rock, TX (US); Gurvinder Singh Chhabra, San Diego, CA (US); Andres Alejandro Oportus Valenzuela, San Diego, CA (US); Nieyan Geng, San Diego, CA (US); Raghuveer Raghavendra, San Diego, CA (US); Christopher Porter, Athens, GA (US); Anand Janakiraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 15/426,473

(22) Filed: Feb. 7, 2017

(65) Prior Publication Data

US 2018/0225224 A1    Aug. 9, 2018

(51) Int. Cl.
*G06F 12/08*    (2016.01)
*G06F 12/128*   (2016.01)
(Continued)

(52) U.S. Cl.
CPC .......... *G06F 12/128* (2013.01); *G06F 12/023* (2013.01); *G06F 12/0875* (2013.01);
(Continued)

(58) Field of Classification Search
CPC ............... G06F 12/023; G06F 12/0875; G06F 2212/7211; G06F 12/128; G06F 12/0897;
(Continued)

(56) References Cited

U.S. PATENT DOCUMENTS

| 6,918,005 B1 * | 7/2005 | Marchant | .............. | G06F 12/023 710/54 |
| 7,024,512 B1 * | 4/2006 | Franaszek | ............. | G06F 12/023 704/500 |

(Continued)

OTHER PUBLICATIONS

International Search Report and Written Opinion for PCT/US2018/013296, dated Mar. 28, 2018, 14 pages.

*Primary Examiner* — Hiep T Nguyen
(74) *Attorney, Agent, or Firm* — Withrow & Terranova, PLLC

(57) ABSTRACT

Reducing bandwidth consumption when performing free memory list cache maintenance in compressed memory schemes of processor-based systems is disclosed. In this regard, a memory system including a compression circuit is provided. The compression circuit includes a compress circuit that is configured to cache free memory lists using free memory list caches comprising a plurality of buffers. When a number of pointers cached within the free memory list cache falls below a low threshold value, an empty buffer of the plurality of buffers is refilled from a system memory. In some aspects, when a number of pointers of the free memory list cache exceeds a high threshold value, a full buffer of the free memory list cache is emptied to the system memory. In this manner, memory access operations for emptying and refilling the free memory list cache may be minimized.

19 Claims, 9 Drawing Sheets

(51) Int. Cl.
   *G06F 12/02*     (2006.01)
   *G06F 12/0875*   (2016.01)
   *G06F 12/0897*   (2016.01)

(52) U.S. Cl.
   CPC .. *G06F 12/0897* (2013.01); *G06F 2212/1044* (2013.01); *G06F 2212/401* (2013.01); *G06F 2212/69* (2013.01)

(58) Field of Classification Search
   CPC ........... G06F 2212/69; G06F 2212/401; G06F 2212/1044
   See application file for complete search history.

(56) References Cited

U.S. PATENT DOCUMENTS

| | | |
|---|---|---|
| 7,089,391 B2 | 8/2006 | Geiger et al. |
| 8,667,575 B2 | 3/2014 | Thakur et al. |
| 8,711,164 B2 | 4/2014 | Dye |
| 8,832,300 B2 | 9/2014 | Plamondon |
| 2002/0078303 A1* | 6/2002 | Rozario ............... G06F 12/023 711/133 |
| 2011/0296063 A1 | 12/2011 | Pais et al. |
| 2014/0351547 A1 | 11/2014 | Dietterich et al. |
| 2015/0339228 A1 | 11/2015 | Heddes et al. |
| 2017/0004069 A1 | 1/2017 | Li et al. |

* cited by examiner

REDUCING BANDWIDTH CONSUMPTION WHEN PERFORMING FREE MEMORY LIST CACHE MAINTENANCE IN COMPRESSED MEMORY SCHEMES OF PROCESSOR-BASED SYSTEMS

BACKGROUND

I. Field of the Disclosure

The technology of the disclosure relates generally to computer memory systems, and more particularly to compressed memory systems configured to compress and decompress data stored in and read from compressed system memory.

II. Background

As applications executed by conventional processor-based systems increase in size and complexity, memory bandwidth may become a constraint on system performance. While available memory bandwidth may be increased through the use of wider memory communications channels, this approach may incur penalties in terms of increased cost and/or additional area required for the memory on an integrated circuit (IC). Thus, one approach to increasing memory bandwidth in a processor-based system without increasing the width of memory communication channels is through the use of data compression. A data compression system can be employed in a processor-based system to store data in a compressed format, thus increasing effective memory capacity without increasing physical memory capacity.

In this regard, some conventional data compression schemes provide a compression engine to compress data to be written to a main system memory. After performing compression, the compression engine writes the compressed data to the system memory, along with metadata that maps a virtual address of the compressed data to a physical address in the system memory where the compressed data is actually stored. The data compression scheme may also maintain lists of free memory blocks (i.e., free memory lists) in the system memory to track areas of memory in which compressed data can be stored. Each free memory list holds pointers to available memory blocks within a compressed data region of the system memory. The contents of the free memory lists may be cached in a free memory list cache of the compression engine.

However, some implementations of free memory list caches may give rise to conditions in which excessive bandwidth is consumed during maintenance of the cached free memory lists. Accordingly, it is desirable to reduce the memory bandwidth required to maintain the free memory list cache.

SUMMARY OF THE DISCLOSURE

Aspects of the present disclosure involve reducing bandwidth consumption when performing free memory list cache maintenance in compressed memory schemes of processor-based systems. In this regard, in exemplary aspects disclosed herein, a memory system including a compression circuit is provided. The compression circuit includes a compress circuit that is configured to cache free memory lists using free memory list caches made up of a plurality of buffers (e.g., two buffers, as a non-limiting example). When a number of pointers cached within the free memory list cache falls below a low threshold value, an empty buffer of the plurality of buffers is refilled from a system memory. Additionally, in some aspects, when a number of pointers of the free memory list cache exceeds a high threshold value, a full buffer of the free memory list cache is emptied to the system memory. In this manner, memory access operations for emptying the free memory list cache to the system memory and refilling the free memory list cache from the system memory may be minimized, thus conserving memory bandwidth.

In another aspect, a memory system is provided. The memory system comprises a compression circuit configured to store compressed data in a memory block of a plurality of memory blocks of a compressed data region of a system memory. The memory system also comprises a free memory list storing a plurality of pointers to a corresponding plurality of free memory blocks of the plurality of memory blocks. The compression circuit comprises a free memory list cache comprising a plurality of buffers, and is configured to cache one or more pointers of the plurality of pointers. The compression circuit further comprises a low threshold value indicating a minimum number of pointers for the free memory list cache. The compression circuit is configured to, upon allocation of a free memory block corresponding to a pointer cached in the free memory list cache, remove the pointer from the free memory list cache, and determine whether a number of pointers of the free memory list cache is below the low threshold value. The compression circuit is further configured to, responsive to determining that a number of pointers of the free memory list cache is below the low threshold value, read a plurality of pointers, corresponding in size to a buffer of the plurality of buffers, from the free memory list. The compression circuit is also configured to replenish an empty buffer of the plurality of buffers with the plurality of pointers.

In another aspect, a memory system for reducing bandwidth consumption when performing free memory list cache maintenance in compressed memory schemes of processor-based systems is provided. The memory system comprises a means for allocating a free memory block of a plurality of memory blocks of a compressed data region of a system memory, wherein the free memory block corresponds to a pointer cached in a free memory list cache, and the free memory list cache comprises a plurality of buffers, and is configured to cache one or more pointers of a plurality of pointers of a free memory list. The memory system further comprises a means for removing the pointer from the free memory list cache, responsive to allocating the free memory block corresponding to the pointer cached in the free memory list cache. The memory system also comprises a means for determining whether a number of pointers of the free memory list cache is below a low threshold value indicating a minimum number of pointers for the free memory list cache. The memory system additionally comprises a means for reading a plurality of pointers, corresponding in size to a buffer of the plurality of buffers, from the free memory list, responsive to determining that a number of pointers of the free memory list cache is below the low threshold value. The memory system further comprises a means for replenishing an empty buffer of the plurality of buffers with the plurality of pointers.

In another aspect, a method for reducing bandwidth consumption in a compressed memory scheme employing free memory lists is provided. The method comprises allocating, by a compression circuit of a memory system, a free memory block of a plurality of memory blocks of a compressed data region of a system memory, wherein the free memory block corresponds to a pointer cached in a free memory list cache, and the free memory list cache comprises a plurality of buffers, and is configured to cache one or more pointers of a plurality of pointers of a free memory list. The method further comprises, responsive to allocating the free memory block corresponding to the pointer cached in the free memory list cache, removing the pointer from the free memory list cache. The method also comprises determining whether a number of pointers of the free memory list cache is below a low threshold value indicating a minimum number of pointers for the free memory list cache. The method additionally comprises, responsive to determining that a number of pointers of the free memory list cache is below the low threshold value, reading a plurality of pointers, corresponding in size to a buffer of the plurality of buffers, from the free memory list. The method also comprises replenishing an empty buffer of the plurality of buffers with the plurality of pointers.

In another aspect, a non-transitory computer-readable medium is provided, having stored thereon computer-executable instructions. When executed by a processor, the computer-executable instructions cause the processor to allocate a free memory block of a plurality of memory blocks of a compressed data region of a system memory, wherein the free memory block corresponds to a pointer cached in a free memory list cache, and the free memory list cache comprises a plurality of buffers, and is configured to cache one or more pointers of a plurality of pointers of a free memory list. The computer-executable instructions further cause the processor to, responsive to allocating the free memory block corresponding to the pointer cached in the free memory list cache, remove the pointer from the free memory list cache. The computer-executable instructions also cause the processor to determine whether a number of pointers of the free memory list cache is below a low threshold value indicating a minimum number of pointers for the free memory list cache. The computer-executable instructions additionally cause the processor to, responsive to determining that a number of pointers of the free memory list cache is below the low threshold value, read a plurality of pointers, corresponding in size to a buffer of the plurality of buffers, from the free memory list. The computer-executable instructions further cause the processor to replenish an empty buffer of the plurality of buffers with the plurality of pointers.

DETAILED DESCRIPTION

Figure 1:
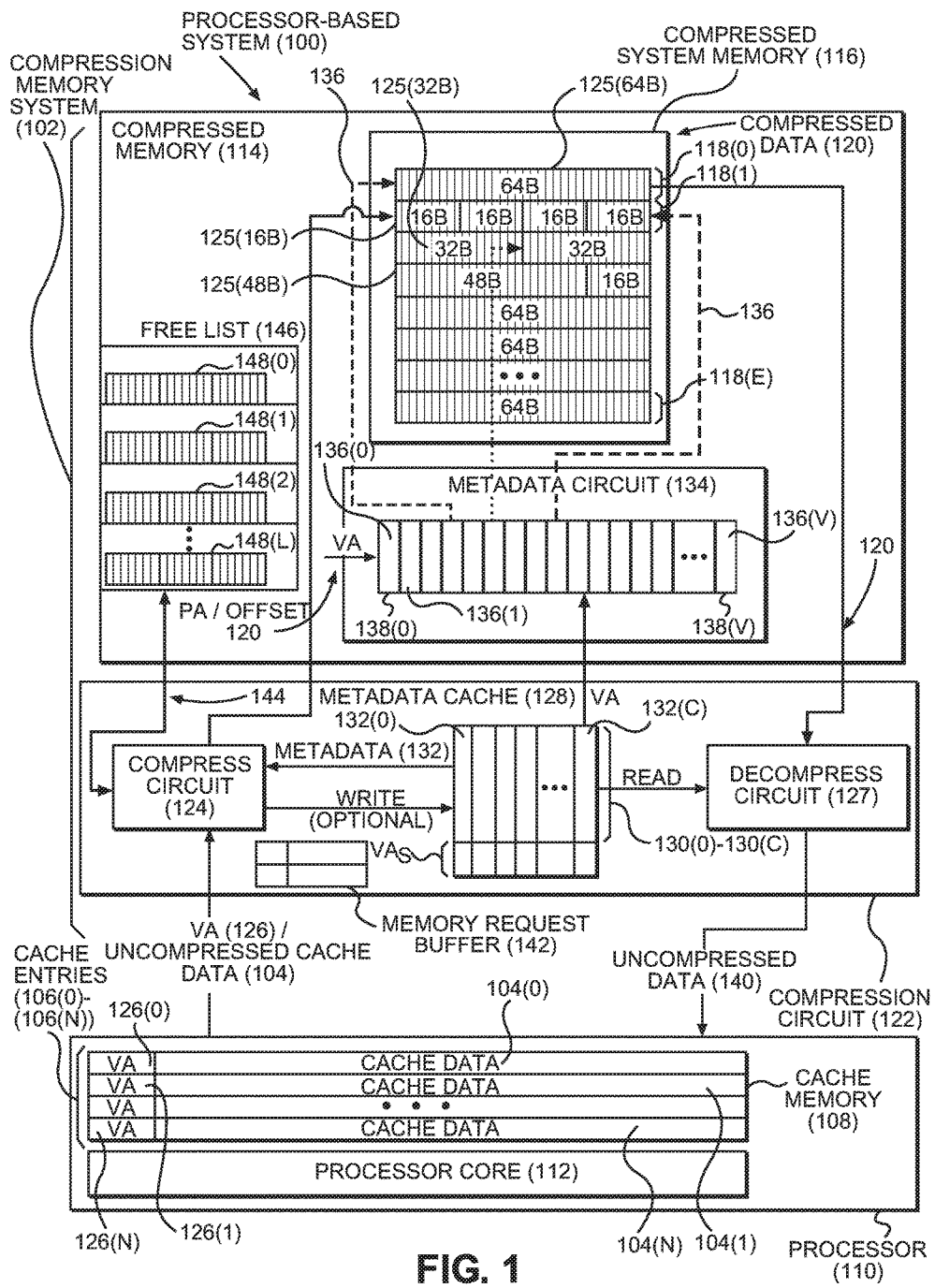
FIG. 1 is a schematic diagram of an exemplary processor-based system that includes a compressed memory system configured to compress cache data from an evicted cache entry in a cache memory, and read metadata used to access a physical address in a compressed system memory to write the compressed cache data.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects of the present disclosure involve reducing bandwidth consumption when performing free memory list cache maintenance in compressed memory schemes of processor-based systems. In this regard, in exemplary aspects disclosed herein, a memory system including a compression circuit is provided. The compression circuit includes a compress circuit that is configured to cache free memory lists using a multiple-buffer free memory list cache. When a number of pointers cached within the free memory list cache falls below a low threshold value, an empty buffer of a plurality of buffers is refilled from a system memory. Additionally, in some aspects, when a number of pointers of the free memory list cache exceeds a high threshold value, a full buffer of the free memory list cache is emptied to the system memory. In this manner, memory access operations for emptying the free memory list cache to the system memory and refilling the free memory list cache from the system memory may be minimized, thus conserving memory bandwidth.

Before discussing examples of processor-based systems that reduce bandwidth consumption when performing free memory list cache maintenance in compressed memory schemes, a processor-based system that is configured to provide data compression is first described. In this regard, FIG. 1 is a schematic diagram of an exemplary processor-based system 100 that includes a compressed memory system 102. The processor-based system 100 is configured to store cache data 104(0)-104(N) in uncompressed form in cache entries 106(0)-106(N) in a cache memory 108. The cache entries 106(0)-106(N) may be cache lines. For example, as shown in FIG. 1, the cache memory 108 may be a level 2 (L2) cache memory included in a processor 110. The cache memory 108 may be private to a processor core 112 in the processor 110 or shared between multiple processor cores, including the processor core 112 in the processor 110. The compressed memory system 102 includes a system memory 114 that includes a compressed data region 116 configured to store data in a memory entry 118(0)-118(E) (which may be memory lines) in compressed form, which is shown in FIG. 1. For example, the system memory 114 may include a double data rate (DDR) static random access memory (SRAM). The processor 110 is configured to access the system memory 114 during read and write operations to execute software instructions and perform other processor operations.

Providing the ability to store compressed data in the compressed data region 116 increases the memory capacity of the processor-based system 100 over the physical memory size of the system memory 114. In some aspects, the processor 110 uses virtual addressing wherein a virtual-to-physical address translation is performed to effectively address the compressed data region 116 without being aware of the compression scheme and compression size of the compressed data region 116. In this regard, a compression circuit 122 is provided in the compressed memory system 102 to compress uncompressed data from the processor 110 to be written into the compressed data region 116, and to decompress compressed data received from the compressed data region 116 to provide such data in uncompressed form to the processor 110. The compression circuit 122 includes a compress circuit 124 configured to compress data from the processor 110 to be written into the compressed data region 116. As non-limiting examples, as shown in FIG. 1, the compress circuit 124 may be configured to compress 64-byte (64 B) data words down to 48-byte (48 B) compressed data words, 32-byte (32 B) compressed data words, or 16-byte (16 B) compressed data words, which can be stored in respective memory blocks 125(64 B), 125(48 B), 125(32 B), 125(16 B), each having a smaller size than an entire memory entry 118(0)-118(E). If uncompressed data from the processor 110 cannot be compressed down to the next lower sized memory block 125 configured for the compressed memory system 102, such uncompressed data is stored uncompressed over the entire width of a memory entry 118(0)-118(E). For example, the width of the memory entry 118(0)-118(E) may be 64 B, and thus can store 64 B memory blocks 125(64 B). The compression circuit 122 also includes a decompress circuit 127 configured to decompress compressed data from the compressed data region 116 to be provided to the processor 110.

However, to provide for faster memory access without the need to compress and decompress, the cache memory 108 is provided. The cache entries 106(0)-106(N) in the cache memory 108 are configured to store the cache data 104(1)-104(N) in uncompressed form. Each of the cache entries 106(0)-106(N) may be the same width as each of the memory entries 118(0)-118(E) for performing efficient memory read and write operations. The cache entries 106(0)-106(N) are accessed by a respective virtual address (VA) tag 126(0)-126(N), because as discussed above, the compressed memory system 102 provides more addressable memory space to the processor 110 than the physical address space provided in the compressed data region 116. When the processor 110 issues a memory read request for a memory read operation, a VA of the memory read request is used to search the cache memory 108 to determine if the VA matches a VA tag 126(0)-126(N) of a cache entry 106(0)-106(N). If so, a cache hit occurs, and the cache data 104(0)-104(N) in the hit cache entry 106(0)-106(N) is returned to the processor 110 without the need to decompress the cache data 104(0)-104(N). However, because the number of cache entries 106(0)-106(N) is less than the number of memory entries 118(0)-118(E), a cache miss can occur where the cache data 104(0)-104(N) for the memory read request is not contained in the cache memory 108.

Thus, with continuing reference to FIG. 1, in response to a cache miss, the cache memory 108 is configured to provide the VA of the memory read request to the compression circuit 122 to retrieve data from the compressed data region 116. In this regard, the compression circuit 122 may first consult a metadata cache 128 that contains metadata cache entries 130(0)-130(C) each containing metadata 132(0)-132(C) indexed by a VA. The metadata cache 128 is faster to access than the compressed data region 116. The metadata 132(0)-132(C) is data, such as a pointer, used to access a physical address (PA) in the compressed data region 116 to access the memory entry 118(0)-118(E) containing the compressed data for the VA. If the metadata cache 128 contains metadata 132(0)-132(C) for the memory read operation, the compression circuit 122 uses the metadata 132(0)-132(C) to access the correct memory entry 118(0)-118(E) in the compressed data region 116 to provide the corresponding compressed data region 116 to the decompress circuit 127. If the metadata cache 128 does not contain metadata 132(0)-132(C) for the memory read request, the compression circuit 122 provides the VA for the memory read request to a metadata circuit 134 that contains metadata 136(0)-136(V) in corresponding metadata entries 138(0)-138(V) for all of the VA space in the processor-based system 100. Thus, the metadata circuit 134 can be linearly addressed by the VA of the memory read request. The metadata 136(0)-136(V) is used to access the correct memory entry 118(0)-118(E) in the compressed data region 116 for the memory read request to provide the corresponding compressed data region 116 to the decompress circuit 127.

With continuing reference to FIG. 1, the decompress circuit 127 receives the compressed data region 116 in response to the memory read request. The decompress circuit 127 decompresses the compressed data region 116 into uncompressed data 140, which can then be provided to the processor 110. The uncompressed data 140 is also stored in the cache memory 108. However, if the cache memory 108 did not have an available cache entry 106(0)-106(N), the cache memory 108 may evict an existing cache entry 106(0)-106(N) to the compressed data region 116 to make room for storing the uncompressed data 140.

To do so, the cache memory 108 first sends the VA and the uncompressed cache data 104 of the evicted cache entry 106(0)-106(N) to the compress circuit 124. The compress circuit 124 receives the VA and the uncompressed cache data 104 for the evicted cache entry 106(0)-106(N). The compress circuit 124 initiates a metadata read operation to the metadata cache 128 to obtain metadata 132 associated with the VA. During, before, or after the metadata read operation, the compress circuit 124 compresses the uncompressed cache data 104 into compressed data to be stored in the compressed data region 116. If the metadata read operation to the metadata cache 128 results in a miss, the metadata cache 128 issues a metadata read operation to the metadata circuit 134 in the system memory 114 to obtain the metadata 136 associated with the VA. The metadata cache 128 is then stalled. Because accesses to the compressed data region 116 can take much longer than the processor 110 can issue memory access operations, uncompressed data 140 received from the processor 110 for subsequent memory write requests may be buffered in a memory request buffer 142.

After the metadata 136 comes back from the compressed data region 116 to update the metadata cache 128, the metadata cache 128 provides the metadata 136 as metadata 132 to the compress circuit 124. The compress circuit 124 determines whether the new compression size of the compressed data region 116 fits into the same memory block size in the compressed data region 116 as used to previously store data for the VA of the evicted cache entry 106(0)-106(N). For example, the processor 110 may have updated the cache data 104(0)-104(N) in the evicted cache entry 106(0)-106(N) since being last stored in the compressed data region 116. If a new memory block 125 is needed to store the compressed data region 116 for the evicted cache entry 106(0)-106(N), the compress circuit 124 recycles a pointer 144 to the current memory block 125 in the compressed memory system 102 associated with the VA of the evicted cache entry 106(0)-106(N) to one of free memory lists 148(0)-148(L) of pointers 144 to available memory blocks 125 in the compressed data region 116. The compress circuit 124 then obtains a pointer 144 from the free memory list 148(0)-148(L) to a new, available memory block 125 of the desired memory block size in the compressed data region 116 to store the compressed data region 116 for the evicted cache entry 106(0)-106(N). The compress circuit 124 then stores the compressed data region 116 for the evicted cache entry 106(0)-106(N) in the memory block 125 in the compressed data region 116 associated with the VA for the evicted cache entry 106(0)-106(N) determined from the metadata 132.

If a new memory block 125 was assigned to the VA for the evicted cache entry 106(0)-106(N), the metadata 132(0)-132(C) in the metadata cache entry 130(0)-130(C) corresponding to the VA tag 126(0)-126(N) of the evicted cache entry 106(0)-106(N) is updated based on the pointer 144 to the new memory block 125. The metadata cache 128 then updates the metadata 136(0)-136(V) in the metadata entry 138(0)-138(V) corresponding to the VA in the metadata cache 128 is based on the pointer 144 to the new memory block 125.

In some aspects, memory bandwidth consumption by the compression circuit 122 may be reduced through the use of free memory list caches 150(0)-150(L), corresponding to the free memory lists 148(0)-148(L). The free memory list caches 150(0)-150(L) may be used by the compression circuit 122 to stock pointers read from the corresponding free memory lists 148(0)-148(L). When the compress circuit 124 allocates a free memory block 125 and needs to obtain a pointer to a new index to the free memory block 125 of the desired memory block size in the compressed data region 116, the compress circuit 124 may retrieve a cached pointer from the free memory list caches 150(0)-150(L) corresponding to the desired memory block size, rather than accessing the free memory lists 148(0)-148(L) directly. This may enable the compress circuit 124 to avoid accessing the system memory 114, thus conserving memory bandwidth. Similarly, when the compress circuit 124 deallocates a memory block 125, the pointer to the memory block 125 may be "recycled" and stored in the free memory list cache 150(0)-150(L) corresponding to the size of the memory block 125.

In some aspects, the size of each of the free memory list caches 150(0)-150(L) corresponds to a memory granule size of the system memory 114 (i.e., a smallest unit of memory that can be read from or written to in the system memory 114). As a non-limiting example, where the memory granule size of the system memory 114 is 64 bytes, each of the free memory list caches 150(0)-150(L) may also be 64 bytes in size. In some aspects, each 64-byte free memory list cache 150(0)-150(L) may store a maximum of 24 pointers of 21 bits each.

Figure 2A:
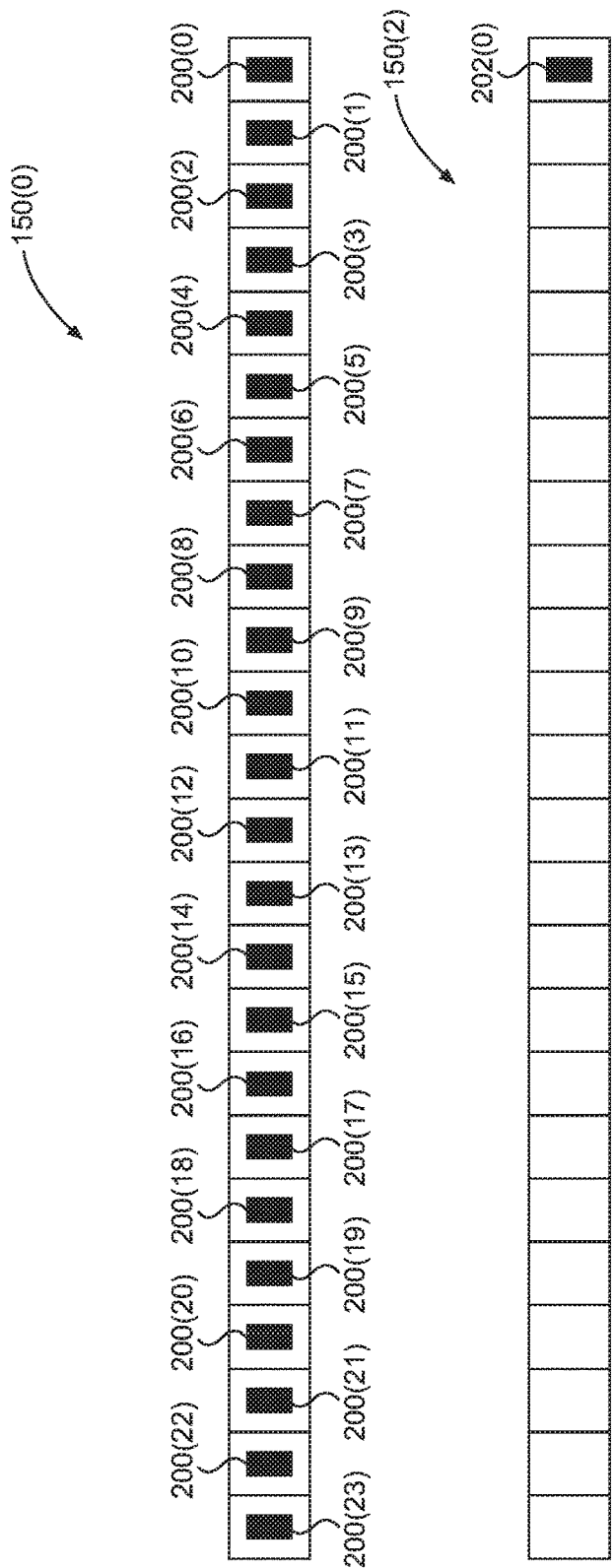
FIGS. 2A-2B are block diagrams illustrating how conventional free memory list caches may incur additional bandwidth when caching pointers for free memory blocks within a compressed region of a system memory.
Figure 2B:
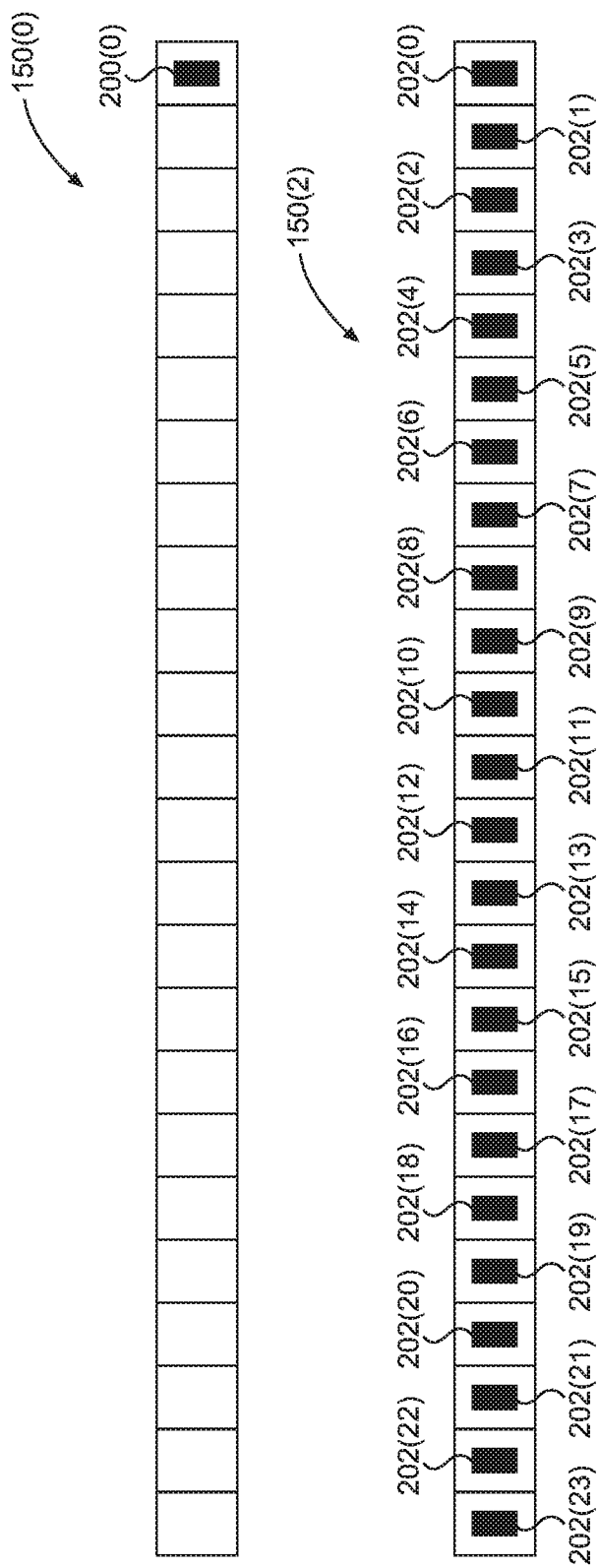

However, when using the free memory list caches 150(0)-150(L) as described above, there may arise conditions in which unnecessary memory bandwidth may be consumed during maintenance of the free memory list caches 150(0)-150(L). To better illustrate one such scenario, FIGS. 2A and 2B are provided. In FIGS. 2A and 2B, the contents of the free memory list caches 150(0) and 150(2), corresponding to the free memory list 148(0) for 64-byte memory blocks 125 and the free memory list 148(2) for 32-byte memory blocks 125, are shown. Each of the free memory list caches 150(0), 150(2) has 24 available slots respectively, in which pointers may be stored. As seen in FIG. 2A, the free memory list cache 150(0) for 64-byte memory blocks 125 is fully occupied by pointers 200(0)-200(23), while the free memory list cache 150(2) for 32-byte memory blocks 125 currently stores only a pointer 202(0).

Now, consider a scenario in which the compression circuit 122 of FIG. 1 performs an operation that results in allocation of a new memory block 125(32 B) and deallocation of a memory block 125(64 B), followed by an operation that results in deallocation of a memory block 125(32 B) and allocation of a new memory block 125(64 B). For example, consider a scenario in which a first previously compressed memory block 125(64 B) is compressed to a smaller size (i.e., the stored compressed data was 64 bytes, but has been recompressed to 32 bytes) followed by a second previously compressed memory block 125(32 B) being expanded to a larger size (i.e., the stored compressed data was 32 bytes, but has been expanded to 64 bytes).

When the first previously compressed memory block 125(64 B) is deallocated, the currently used 64-byte memory block 125(64 B) is freed, so the compression circuit 122 needs to add a pointer to the free memory list cache 150(0). However, as seen in FIG. 2A, the free memory list cache 150(0) is already full, so the 24 pointers 200(0)-200(23) stored therein must be written to the free memory list 148(0) before the new pointer 200(0) is stored in the free memory list cache 150(0). To allocate the 32-byte memory block 125(32 B), the last pointer 202(0) of the free memory list cache 150(2) is consumed, so 24 new pointers 202(0)-202(23) must be read from the free memory list 148(2) to replenish the free memory list cache 150(2). The contents of the free memory list caches 150(0), 150(2) after completion of these operations is illustrated in FIG. 2B.

Referring now to FIG. 2B, when the second previously compressed memory block 125(32 B) is deallocated, a similar sequence of pointer reads and writes occurs. The compression circuit 122 needs to add a pointer to the free memory list cache 150(2), but, as seen in FIG. 2B, the free memory list cache 150(2) is now full. Thus, the 24 pointers 202(0)-202(23) stored therein are written back to the free memory list 148(2) before the new pointer 202(0) is stored in the free memory list cache 150(0). To allocate the 64-byte memory block 125(64 B), the pointer 200(0) of the free memory list cache 150(0) is consumed, requiring 24 new pointers to be read from the free memory list 148(0) to replenish the free memory list cache 150(0). After the free memory list caches 150(0), 150(2) have been updated, the contents of the free memory list caches 150(0), 150(2) revert back to those illustrated in FIG. 2A.

The operations described above for writing and reading pointers to the system memory 114 consume memory bandwidth. As a result, they may cause other operations of the compression circuit 122 to stall while the full free memory list cache 150(0) is sending data to the system memory 114 and/or while the empty free memory list cache 150(2) is being refilled with data from the system memory 114. Moreover, if a series of similar, sustained operations takes place, operations of the compression circuit 122 may be stalled on every memory access attempt.

Figure 3:
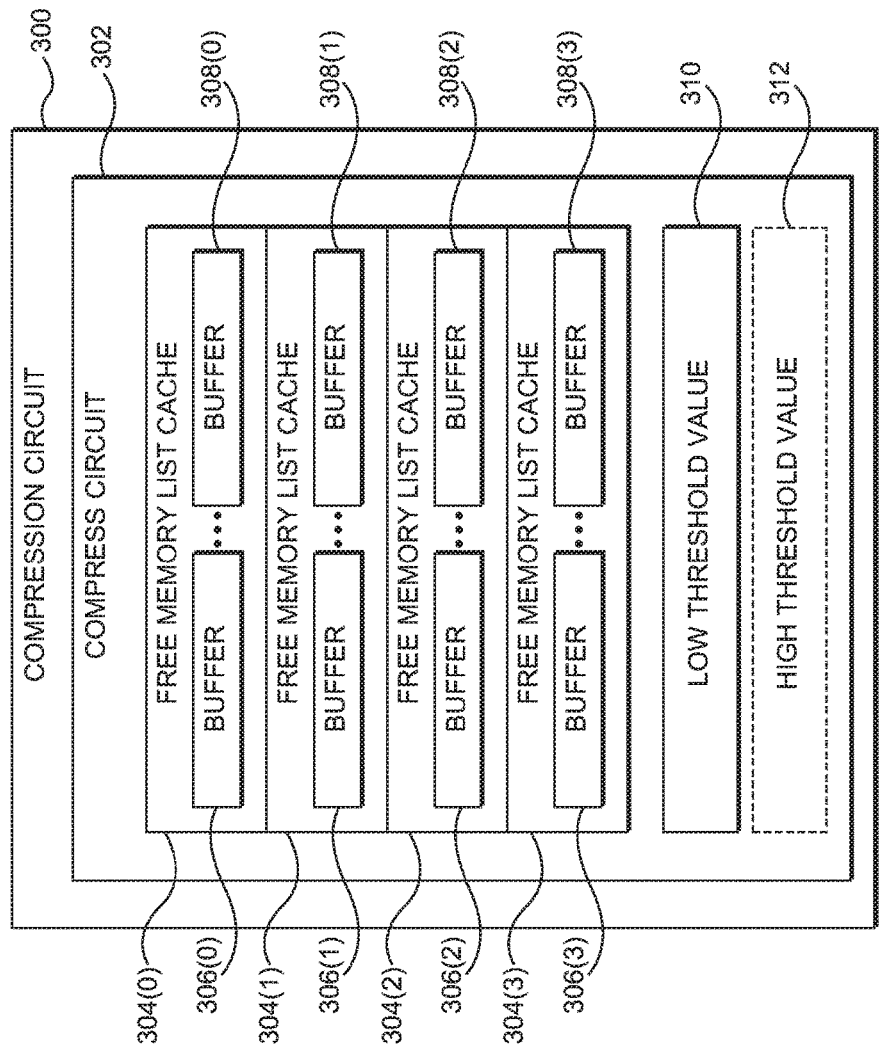
FIG. 3 is a block diagram of an exemplary compression circuit employing free memory list caches that provide a plurality of buffers (in this example, two buffers) for caching pointers for free memory blocks.

In this regard, FIG. 3 illustrates a compression circuit 300 including a compress circuit 302 for reducing bandwidth consumption when performing free memory list cache maintenance. It is to be understood that the compression circuit 300 and the compress circuit 302 of FIG. 3 correspond in functionality to the compression circuit 122 and the compress circuit 124, respectively, of FIG. 1, and that some elements of the compress circuit 302 and the compression circuit 300 are omitted from FIG. 3 for the sake of clarity. The compress circuit 302 includes free memory list caches 304(0)-304(3), which, like the free memory list caches 150(0)-150(L) of FIG. 1, correspond to the free memory lists 148(0)-148(L) of FIG. 1.

However, unlike the free memory list caches 150(0)-150(L) of FIG. 1, the free memory list caches 304(0)-304(3) include a plurality of buffers (in this example, first buffers 306(0)-306(3) and second buffers 308(0)-308(3)). In the example of FIG. 3, the size of each of the first buffers 306(0)-306(3) and the second buffers 308(0)-308(3) corresponds to a memory granule size of the system memory 114. Thus, when the memory granule size of the system memory 114 is 64 bytes, each of the first buffers 306(0)-306(3) and the second buffers 308(0)-308(3) is also 64 bytes in size. Note that some aspects may provide that the plurality of buffers 306(0)-306(3), 308(0)-308(3) provided by the free memory list caches 304(0)-304(3) may have sizes that do not correspond to the memory granule size of the system memory 114.

The compress circuit 302 provides a low threshold value 310, which indicates a minimum number of pointers that may be stored in each of the free memory list caches 304(0)-304(3) before a refilling operation is triggered. Similarly, in some aspects, the compress circuit 302 may also provide a high threshold value 312 that indicates a maximum number of pointers that may be stored in each of the free memory list caches 304(0)-304(3) before an emptying operation is triggered. In exemplary operation, the compress circuit 302 is configured to perform a refill operation on the free memory list cache 304(0), for example, by refilling whichever of the first buffer 306(0) or the second buffer 308(0) is empty. Likewise, the compress circuit 302 according to some aspects may also perform an emptying operation on the free memory list cache 304(0) by emptying whichever of the first buffer 306(0) or the second buffer 308(0) is full.

Figure 4A:
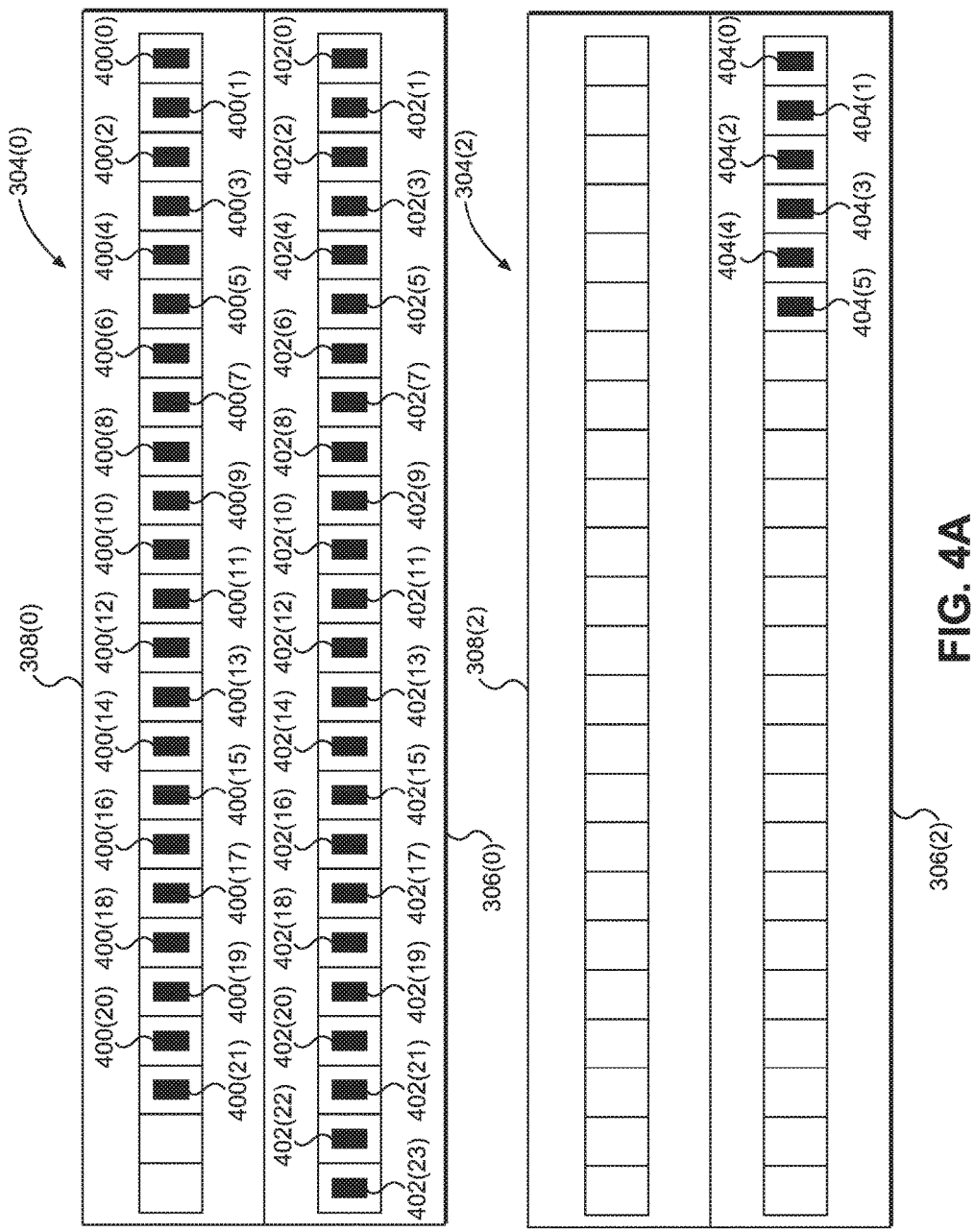
FIGS. 4A-4B are block diagrams illustrating how the free memory list caches of FIG. 3 may operate to reduce bandwidth consumption when caching pointers for free memory blocks within a compressed region of a system memory.
Figure 4B:
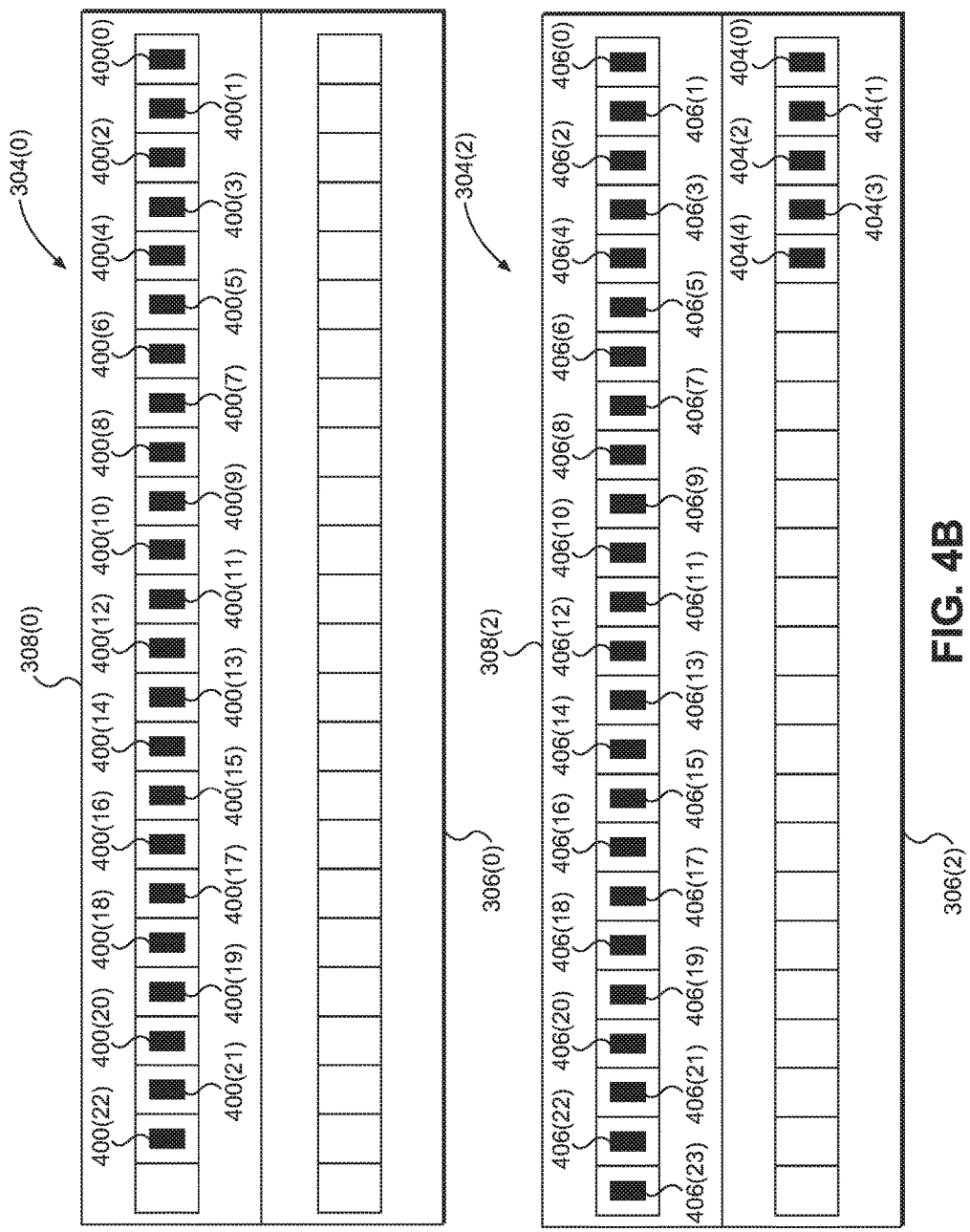

To illustrate how the plurality of buffers 306(0)-306(3), 308(0)-308(3) of the free memory list caches 304(0)-304(3) reduce memory bandwidth consumption, FIGS. 4A and 4B are provided. FIGS. 4A and 4B illustrate the contents of the free memory list caches 304(0), 304(2), corresponding to the free memory list 148(0) for 64-byte memory blocks 125 and the free memory list 148(2) for 32-byte memory blocks 125 of FIG. 1, in a scenario analogous to that described above with respect to FIGS. 2A and 2B. At the start, the second buffer 308(0) of the free memory list cache 304(0) contains 22 pointers 400(0)-400(21), while the first buffer 306(0) of the free memory list cache 304(0) is completely full with 24 pointers 402(0)-402(23). In contrast, the free memory list cache 304(2) only stores six (6) pointers 404(0)-404(5). In this example, the low threshold value 310 of FIG. 3, indicating a minimum number of pointers stored in the free memory list caches 304(0), 304(2), has a value of six (6). It is also assumed that the high threshold value 312 of FIG. 3, indicating a maximum number of pointers 400, 402 stored in the free memory list caches 304(0), 304(2), has a value of 46.

In FIG. 4A, it is assumed that a first previously compressed memory block 125(64 B) is compressed to a smaller size (i.e., the stored compressed data was 64 bytes, but has been recompressed to 32 bytes) followed by a second previously compressed memory block 125(32 B) being expanded to a larger size (i.e., the stored compressed data was 32 bytes, but has been expanded to 64 bytes). Thus, when the first previously compressed memory block 125(64 B) is deallocated, the currently used 64-byte memory block 125(64 B) is freed, so the compression circuit 300 needs to add a pointer to the free memory list cache 304(0). Because the free memory list cache 304(0) already contains 46 pointers 400(0)-400(21), 402(0)-402(23), adding another pointer to the free memory list cache 304(0) will exceed the value of the high threshold value 312. Accordingly, the 24 pointers 400(0)-400(23) stored in the full second buffer 308(0) are written to the free memory list 148(0) before a new pointer is stored in the second buffer 308(0). The contents of the first buffer 306(2) of the free memory list cache 304(0) remain unchanged. To allocate the 32-byte memory block 125(32 B), the pointer 404(5) of the first buffer 306(0) of the free memory list cache 304(2) is consumed. After the pointer 404(5) is consumed, the compress circuit 302 determines that the number of remaining pointers 404(0)-404(4) in the free memory list cache 304(2) is below the low threshold value 310, so 24 new pointers are read from the free memory list 148(2) and used to replenish the empty second buffer 308(2) of the free memory list cache 304(2). The contents of the free memory list caches 304(0), 304(2) after completion of these operations is illustrated in FIG. 4B.

Referring now to FIG. 4B, when the second previously compressed memory block 125(32 B) is deallocated, the compress circuit 302 needs to add a new pointer to the free memory list cache 304(2). As seen in FIG. 4B, the free memory list cache 304(2) has plenty of room to store the new pointer alongside pointers 404(0)-404(4) and 406(0)-406(23) without requiring a memory access to the system memory 114. Similarly, to allocate the 64-byte memory block 125(64 B), the pointer 400(22) of the free memory list cache 304(0) is consumed. However, because the free memory list cache 304(0) still stores 22 pointers 400(0)-400(21), there is no need to access the system memory 114 to replenish the free memory list cache 304(0).

Figure 5:
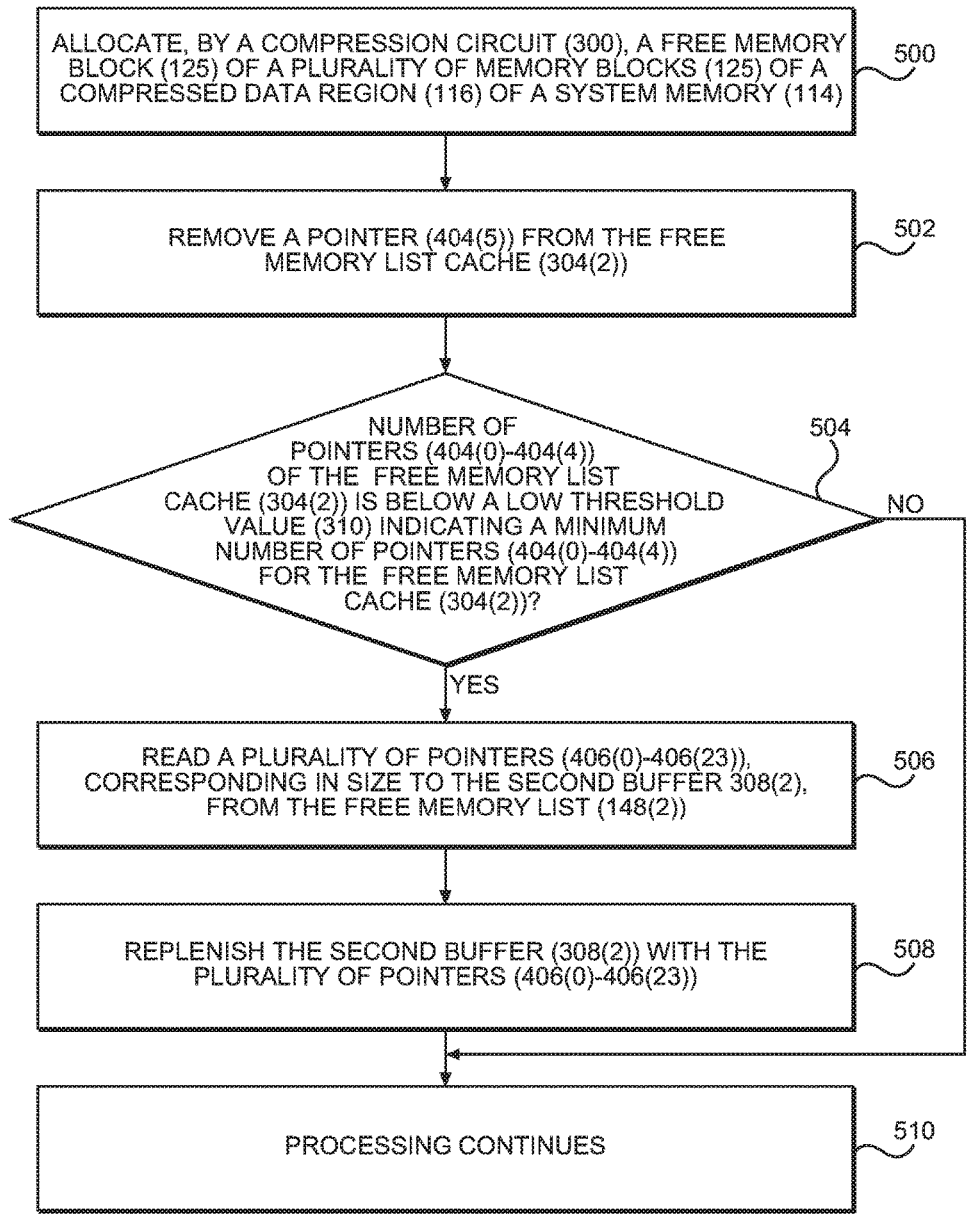
FIG. 5 is a flowchart illustrating exemplary operations of the compression circuit of FIG. 3 for reducing bandwidth consumption when allocating free memory blocks of a compressed memory region.

To illustrate exemplary operations of the compression circuit 300 for reducing bandwidth consumption during allocation of free memory blocks 125, FIG. 5 is provided. For the sake of clarity, elements of FIGS. 1, 3, and 4A-4B are referenced in describing FIG. 5. In FIG. 5, operations begin with the compression circuit 300 allocating a free memory block 125 of a plurality of memory blocks 125 of a compressed data region 116 of a system memory 114 (block 500). Accordingly, the compression circuit 300 may be referred to herein as "a means for allocating a free memory block of a plurality of memory blocks of a compressed data region of a system memory." The compression circuit 300 then removes a pointer 404(5) from the free memory list cache 304(2) (block 502). In this regard, the compression circuit 300 may be referred to herein as "a means for removing the pointer from the free memory list cache, responsive to allocating the free memory block corresponding to the pointer of the first buffer of the free memory list cache."

The compression circuit 300 next determines whether a number of pointers 404(0)-404(4) of the free memory list cache 304(2) is below a low threshold value 310 indicating a minimum number of pointers 404(0)-404(4) for the free memory list cache 304(2) (block 504). The compression circuit 300 thus may be referred to herein as "a means for determining whether a number of pointers of the free memory list cache is below a low threshold value indicating a minimum number of pointers for the free memory list cache." If the compression circuit 300 determines at decision block 504 that the number of pointers 406(0)-406(4) of the free memory list cache 304(2) is below the low threshold value 310, the compression circuit 300 reads a plurality of pointers 406(0)-406(23), corresponding in size to the second buffer 308(2), from the free memory list 148(2) (block 506).

Accordingly, the compression circuit 300 may be referred to herein as "a means for reading the plurality of pointers, corresponding in size to a buffer of the plurality of buffers, from the free memory list, responsive to determining that a number of pointers of the free memory list cache is below the low threshold value." The compression circuit 300 then replenishes an empty buffer (i.e., the second buffer 308(2)) with the plurality of pointers 406(0)-406(23) (block 508). In this regard, the compression circuit 300 may be referred to herein as "a means for replenishing an empty buffer of the plurality of buffers with the plurality of pointers." Processing then continues at block 510. If the compression circuit 300 determines at decision block 504 that the number of pointers 406(0)-406(4) of the free memory list cache 304(2) is not below the low threshold value 310, processing continues at block 510.

Figure 6:
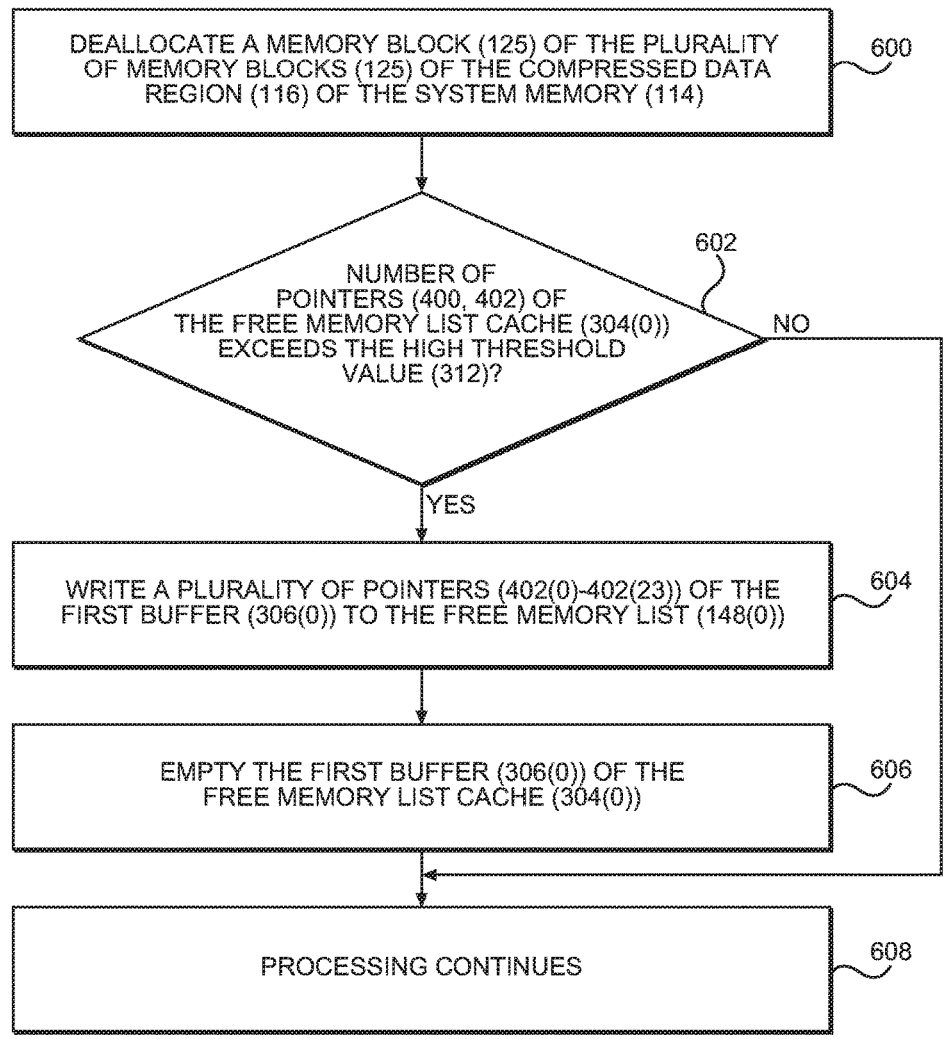
FIG. 6 is a flowchart illustrating exemplary operations of the compression circuit of FIG. 3 for reducing bandwidth consumption during deallocation of memory blocks of a compressed memory region.

FIG. 6 is provided to illustrate exemplary operations of the compression circuit 300 for reducing bandwidth consumption during deallocation of memory blocks 125. Elements of FIGS. 1, 3, and 4A-4B are referenced in describing FIG. 6 for the sake of clarity. Operations in FIG. 6 begin with the compression circuit 300 deallocating a memory block 125 of the plurality of memory blocks 125 of the compressed data region 116 of the system memory 114 (block 600). The compression circuit 300 thus may be referred to herein as "a means for deallocating a memory block of the plurality of memory blocks of the compressed data region of the system memory."

The compression circuit 300 then determines whether a number of pointers 400, 402 of the free memory list cache 304(0) exceeds the high threshold value 312 (block 602). Accordingly, the compression circuit 300 may be referred to herein as "a means for determining whether a number of pointers of the free memory list cache is exceeds a high threshold value indicating a maximum number of pointers for the free memory list cache, responsive to deallocating the memory block of the plurality of memory blocks of the compressed data region of the system memory." If the compression circuit 300 determines at decision block 602 that a number of pointers 400(0)-400(21), 402(0)-402(23) of the free memory list cache 304(0) exceeds the high threshold value 312, the compression circuit 300 writes a plurality of pointers 402(0)-402(23) of a full buffer (i.e., the first buffer 306(0)) to the free memory list 148(0) (block 604). In this regard, the compression circuit 300 may be referred to herein as "a means for writing a plurality of pointers from a full buffer of the plurality of buffers to the free memory list, responsive to determining that a number of pointers of the free memory list cache exceeds the high threshold value." The compression circuit 300 next empties the first buffer 306(0) of the free memory list cache 304(0) (block 606). The compression circuit 300 thus may be referred to herein as "a means for emptying a full buffer of the plurality of buffers." Processing then continues at block 608. If the compression circuit 300 determines at decision block 602 that a number of pointers 400, 402 of the free memory list cache 304(0) does not exceed the high threshold value 312, processing resumes at block 608.

Reducing bandwidth consumption when performing free memory list cache maintenance in compressed memory schemes of processor-based systems may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
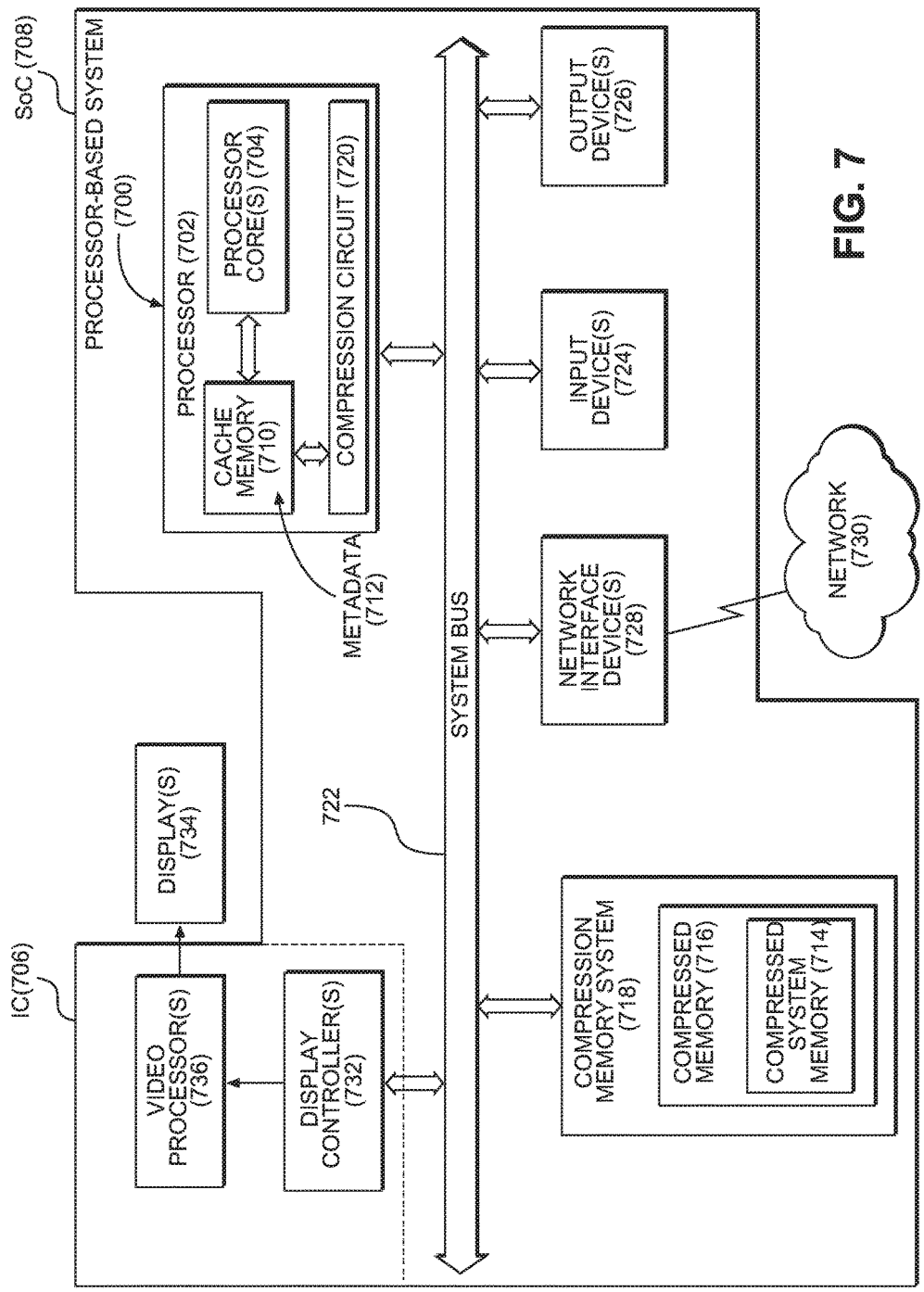
FIG. 7 is a block diagram of an exemplary processor-based system, such as the processor-based system in FIG. 1, that includes a memory system, such as the memory system in FIG. 1, configured to use multiple-buffer free memory list caches to reduce bandwidth consumption in managing the free memory list cache.

In this regard, FIG. 7 illustrates an example of a processor-based system 700 that includes a processor 702, including one or more processor cores 704. The processor-based system 700 is provided in an integrated circuit (IC) 706. The IC 706 may be included in or provided as a system-on-a-chip (SoC) 708 as an example. The processor 702 includes a cache memory 710 that includes metadata 712 for its uncompressed cache entries for use in mapping evicted cache entries to physical addresses in a compressed system memory 714 as part of a compression memory 716 in a compressed memory system 718. For example, the processor 702 may be the processor 110 in FIG. 1, the cache memory 710 may be the cache memory 108 in FIG. 1, and the compressed data region 116 in FIG. 1 may be the compressed memory system 718, as non-limiting examples. A compression circuit 720 is provided for compressing and decompressing data to and from the compressed memory system 718. The compression circuit 720 may be provided in the processor 702 or outside of the processor 702 and communicatively coupled to the processor 702 through a shared or private bus. The compression circuit 720 may be the compression circuit 300 in FIG. 3 as a non-limiting example.

The processor 702 is coupled to a system bus 722 to intercouple master and slave devices included in the processor-based system 700. The processor 702 can also communicate with other devices by exchanging address, control, and data information over the system bus 722. Although not illustrated in FIG. 7, multiple system buses 722 could be provided, wherein each system bus 722 constitutes a different fabric. For example, the processor 702 can communicate bus transaction requests to the compressed memory system 718 as an example of a slave device. Other master and slave devices can be connected to the system bus 722. As illustrated in FIG. 7, these devices can include one or more input devices 724. The input device(s) 724 can include any type of input device, including but not limited to input keys, switches, voice processors, etc. The input device(s) 724 may be included in the IC 706 or external to the IC 706, or a combination of both. Other devices that can be connected to the system bus 722 can also include one or more output devices 726 and one or more network interface devices 728. The output device(s) 726 can include any type of output device, including but not limited to audio, video, other visual indicators, etc. The output device(s) 726 may be included in the IC 706 or external to the IC 706, or a combination of both. The network interface device(s) 726 can be any devices configured to allow exchange of data to and from a network 730. The network 730 can be any type of network, including but not limited to a wired or wireless network, a private or public network, a local area network (LAN), a wireless local area network (WLAN), a wide area network (WAN), a BLUETOOTH™ network, and the Internet. The network interface device(s) 728 can be configured to support any type of communications protocol desired.

Other devices that can be connected to the system bus 722 can also include one or more display controllers 732 as examples. The processor 702 may be configured to access the display controller(s) 732 over the system bus 722 to control information sent to one or more displays 734. The display controller(s) 732 can send information to the display(s) 734 to be displayed via one or more video processors 736, which process the information to be displayed into a format suitable for the display(s) 734. The display controller(s) 732 and/or the video processor(s) 736 may be included in the IC 706 or external to the IC 706, or a combination of both.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in computer-executable instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory system, comprising:
    a compression circuit configured to store compressed data in a memory block of a plurality of memory blocks of a compressed data region of a system memory; and
    a free memory list storing a plurality of pointers to a corresponding plurality of free memory blocks of the plurality of memory blocks;
    the compression circuit comprising:
        a free memory list cache comprising a plurality of buffers and configured to cache one or more pointers of the plurality of pointers; and
        a low threshold value indicating a minimum number of pointers for the free memory list cache;
    the compression circuit configured to, upon allocation of a free memory block corresponding to a pointer cached in the free memory list cache:
        remove the pointer from the free memory list cache;
        determine whether a number of pointers in the free memory list cache is below the low threshold value; and
        responsive to determining that a number of pointers in the free memory list cache is below the low threshold value:
            read a plurality of pointers, corresponding in size to a size of a buffer of the plurality of buffers, from the free memory list; and
            replenish an empty buffer of the plurality of buffers with the plurality of pointers.

2. The memory system of claim 1, wherein:
    the compression circuit further comprises a high threshold value indicating a maximum number of pointers for the free memory list cache; and
    the compression circuit is further configured to, upon deallocation of a memory block:
        determine whether a number of pointers in the free memory list cache exceeds the high threshold value; and responsive to determining that a number of pointers in the free memory list cache exceeds the high threshold value:
write a plurality of pointers from a full buffer of the plurality of buffers to the free memory list; and
empty the full buffer of the plurality of buffers.

3. The memory system of claim 1, wherein the free memory list comprises one of a plurality of free memory lists of the system memory, each free memory list of the plurality of free memory lists corresponding to a different size of the plurality of memory blocks of the compressed data region of the system memory.

4. The memory system of claim 3, wherein the plurality of free memory lists comprises:
a free memory list corresponding to a plurality of available 64 byte memory blocks of the plurality of memory blocks of the compressed data region of the system memory;
a free memory list corresponding to a plurality of available 48 byte memory blocks of the plurality of memory blocks of the compressed data region of the system memory;
a free memory list corresponding to a plurality of available 32 byte memory blocks of the plurality of memory blocks of the compressed data region of the system memory; and
a free memory list corresponding to a plurality of available 16 byte memory blocks of the plurality of memory blocks of the compressed data region of the system memory.

5. The memory system of claim 1, wherein a size of each buffer of the plurality of buffers corresponds to a size of a memory granule of the system memory.

6. The memory system of claim 1, wherein each buffer of the plurality of buffers is sized to store 24 pointers each 21 bits in size.

7. The memory system of claim 1 integrated into a processor-based system.

8. The memory system of claim 1 integrated into a system-on-a-chip (SoC) comprising a processor.

9. The memory system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device (e.g., a smart watch, a health or fitness tracker, eyewear, etc.); a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A memory system for reducing bandwidth consumption when performing free memory list cache maintenance in compressed memory schemes of processor-based systems, comprising:
a means for allocating a free memory block of a plurality of memory blocks of a compressed data region of a system memory, wherein:
the free memory block corresponds to a pointer cached in a free memory list cache; and
the free memory list cache comprises a plurality of buffers, and is configured to cache one or more pointers of a plurality of pointers of a free memory list;
a means for removing the pointer from the free memory list cache, responsive to allocating the free memory block corresponding to the pointer cached in the free memory list cache;
a means for determining whether a number of pointers in the free memory list cache is below a low threshold value indicating a minimum number of pointers for the free memory list cache;
a means for reading a plurality of pointers, corresponding in size to a size of a buffer of the plurality of buffers, from the free memory list, responsive to determining that a number of pointers in the free memory list cache is below the low threshold value; and
a means for replenishing an empty buffer of the plurality of buffers with the plurality of pointers.

11. The memory system of claim 10, further comprising:
a means for deallocating a memory block of the plurality of memory blocks of the compressed data region of the system memory;
a means for determining whether a number of pointers in the free memory list cache exceeds a high threshold value indicating a maximum number of pointers for the free memory list cache, responsive to deallocating the memory block of the plurality of memory blocks of the compressed data region of the system memory;
a means for writing a plurality of pointers from a full buffer of the plurality of buffers to the free memory list, responsive to determining that a number of pointers in the free memory list cache exceeds the high threshold value; and
a means for emptying the full buffer of the plurality of buffers.

12. A method for reducing bandwidth consumption in a compressed memory scheme employing free memory lists, comprising:
allocating, by a compression circuit of a memory system, a free memory block of a plurality of memory blocks of a compressed data region of a system memory, wherein:
the free memory block corresponds to a pointer cached in a free memory list cache; and
the free memory list cache comprises a plurality of buffers, and is configured to cache one or more pointers of a plurality of pointers of a free memory list; and
responsive to allocating the free memory block corresponding to the pointer cached in the free memory list cache:
removing the pointer from the free memory list cache;
determining whether a number of pointers in the free memory list cache is below a low threshold value indicating a minimum number of pointers for the free memory list cache; and
responsive to determining that a number of pointers in the free memory list cache is below the low threshold value:
reading a plurality of pointers, corresponding in size to a size of a buffer of the plurality of buffers, from the free memory list; and
replenishing an empty buffer of the plurality of buffers with the plurality of pointers.

13. The method of claim 12, further comprising:
deallocating a memory block of the plurality of memory blocks of the compressed data region of the system memory; and
responsive to deallocating the memory block of the plurality of memory blocks of the compressed data region of the system memory:
determining whether a number of pointers in the free memory list cache exceeds a high threshold value indicating a maximum number of pointers for the free memory list cache; and
responsive to determining that a number of pointers in the free memory list cache exceeds the high threshold value:
writing a plurality of pointers from a full buffer of the plurality of buffers to the free memory list; and
emptying the full buffer of the plurality of buffers.

14. The method of claim 12, wherein the free memory list comprises one of a plurality of free memory lists of the system memory, each free memory list of the plurality of free memory lists corresponding to a different size of the plurality of memory blocks of the compressed data region of the system memory.

15. The method of claim 14, wherein the plurality of free memory lists comprises:
a free memory list corresponding to a plurality of available 64 byte memory blocks of the plurality of memory blocks of the compressed data region of the system memory;
a free memory list corresponding to a plurality of available 48 byte memory blocks of the plurality of memory blocks of the compressed data region of the system memory;
a free memory list corresponding to a plurality of available 32 byte memory blocks of the plurality of memory blocks of the compressed data region of the system memory; and
a free memory list corresponding to a plurality of available 16 byte memory blocks of the plurality of memory blocks of the compressed data region of the system memory.

16. The method of claim 12, wherein a size of each buffer of the plurality of buffers corresponds to a size of a memory access granule of the system memory.

17. The method of claim 12, wherein each buffer of the plurality of buffers is sized to store 24 pointers each 21 bits in size.

18. A non-transitory computer-readable medium having stored thereon computer-executable instructions which, when executed by a processor, cause the processor to:
allocate a free memory block of a plurality of memory blocks of a compressed data region of a system memory, wherein:
the free memory block corresponds to a pointer cached in a free memory list cache; and
the free memory list cache comprises a plurality of buffers, and is configured to cache one or more pointers of a plurality of pointers of a free memory list; and
responsive to allocating the free memory block corresponding to the pointer cached in the free memory list cache:
remove the pointer from the free memory list cache;
determine whether a number of pointers in the free memory list cache is below a low threshold value indicating a minimum number of pointers for the free memory list cache; and
responsive to determining that a number of pointers in the free memory list cache is below the low threshold value:
read a plurality of pointers, corresponding in size to a size of a buffer of the plurality of buffers, from the free memory list; and
replenish an empty buffer of the plurality of buffers with the plurality of pointers.

19. The non-transitory computer-readable medium of claim 18 having stored thereon computer-executable instructions which, when executed by a processor, further cause the processor to:
deallocate a memory block of the plurality of memory blocks of the compressed data region of the system memory; and
responsive to deallocating the memory block of the plurality of memory blocks of the compressed data region of the system memory:
determine whether a number of pointers in the free memory list cache exceeds a high threshold value indicating a maximum number of pointers for the free memory list cache; and
responsive to determining that a number of pointers in the free memory list cache exceeds the high threshold value:
write a plurality of pointers from a full buffer of the plurality of buffers to the free memory list; and
empty the full buffer of the plurality of buffers.

* * * * *